Patented Aug. 13, 1940

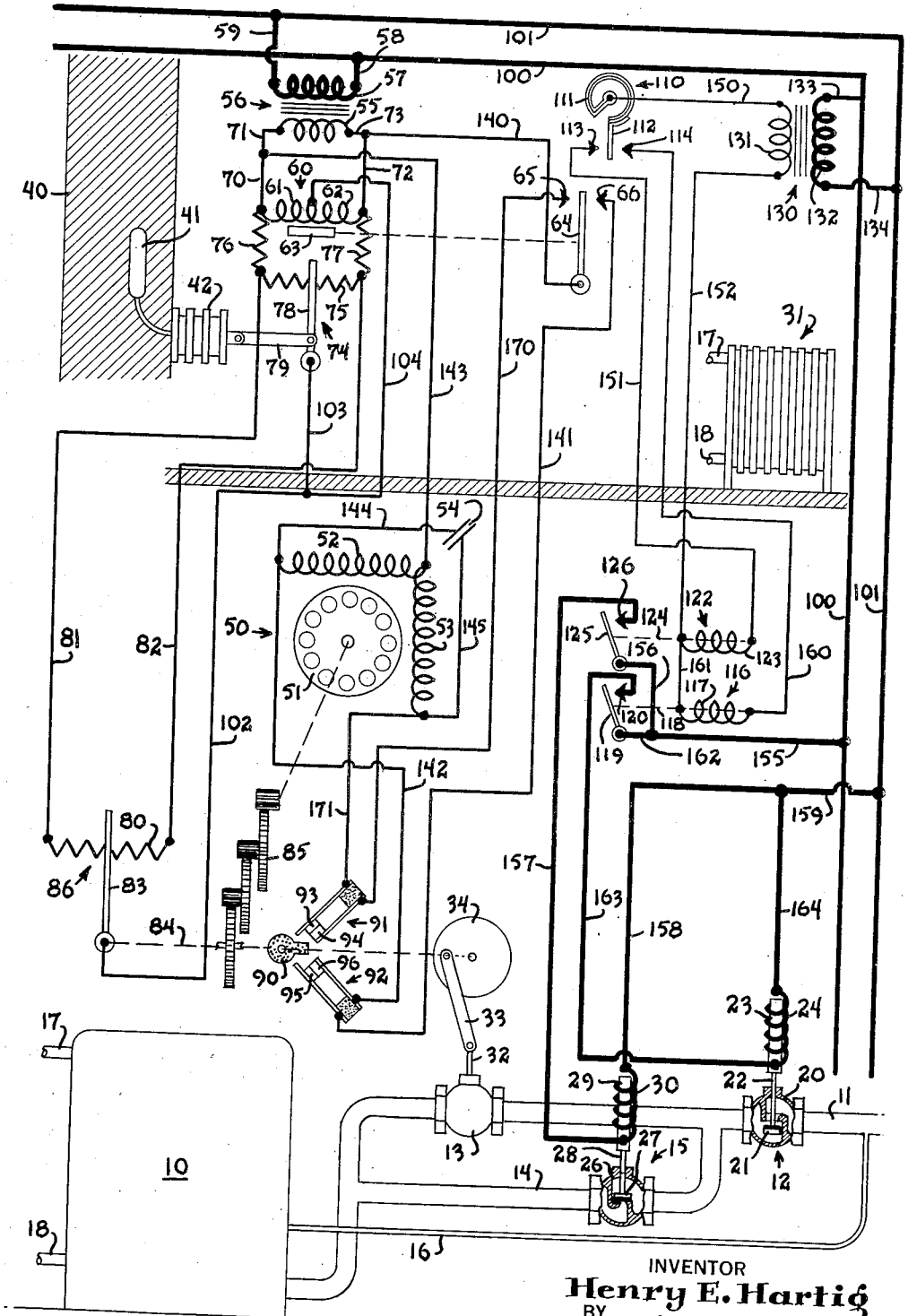

2,211,694

UNITED STATES PATENT OFFICE 2,211,694

TEMPERATURE CONTROL SYSTEM

Henry E. Hartig, Robbinsdale, Minn., assignor to Minneapolis-Honeywell Regulator Company, Minneapolis, Minn., a corporation of Delaware Application September 9, 1937, Serial No. 163,052

3 Claims. (Cl. 236—91)

This invention relates to a temperature control system and while I have illustrated it in connection with a heating system, it should be understood that it is equally applicable to a cooling system.

In a conventional type of a modern heating system, a heater is controlled by a space thermostat to maintain the temperature of the space being heated within certain predetermined limits. One of the defects of such a system is due to the time lag that necessarily exists between the time the space thermostat calls for more heat and the time that the heat arrives in the space being heated. The effect of a rise in temperature in the heater is not felt in the space being heated for a considerable time, and as a result, the temperature in the space may continue to fall for an appreciable time after the thermostat calls for heat, before the temperature starts to rise again, thus causing physical discomfort to the occupants of the space.

It is well known that a change in temperature in the atmosphere surrounding a building is not felt within the building for a considerable time because of the insulating properties of the walls. This knowledge is utilized to advantage in my system to anticipate a change in temperature in the space being heated so that the temperature of the heater is raised before actual additional heat is required in the space, but at such a time that additional heat will be furnished to the space at the same time as the drop in outside temperature makes its effect apparent in the space.

One way of accomplishing this is by placing a temperature responsive device in a wall of the space, at such a point in the wall that the time required for a change in temperature at this point to affect the temperature of the space is the same as the time required for the change in temperature in the heater to affect the temperature of the space. Fuel is continuously supplied to the heater, and a valve regulates the amount of fuel being supplied, this valve being controlled by the aforementioned temperature responsive device so that the correct amount of fuel is being continuously supplied to maintain a substantially uniform temperature. Additional controlling means for the fuel are provided to compensate for abnormal conditions affecting the temperature of the space which conditions can not be effectively controlled by the temperature responsive device in the wall.

It is therefore an object of my invention to provide an improved control means for a temperature changing system by which the temperature of a space is maintained at a constant value.

A further object of my invention is to provide means for compensating for the effect of the time lag of a temperature changing device on a space being controlled thereby.

More specifically, it is an object of my invention to provide a temperature changing system wherein a temperature changing device is provided for controlling the temperature of a space, and wherein a temperature changing medium is continuously supplied to said device in varying amounts in accordance with outside temperature changes, and wherein the amount of the temperature changing medium being supplied is varied in advance of a call for more or less heat in the space so that the amount of heat reaching the space is varied at the same time that the effect of the changing outdoor temperature is felt in the space.

Other objects will become apparent upon a study of the specification, claims, and appended drawing, wherein is schematically illustrated a preferred form of my invention.

Referring to the drawing, a heater 10 is provided which may be a gas fired hot water furnace, for example. For supplying gas to the furnace 10, a pipe line 11 is provided, said pipe line being controlled by valves 12 and 13. A pipe 14 shunts the valve 13 and is in turn controlled by a valve 15. A pipe line 16 constantly supplies fuel to a suitable pilot (not shown) for insuring the ignition of the gas issuing from the burner (not shown) in furnace 10. Pipes 17 and 18 connect the furnace 10 to a radiator 31 located in the space being controlled.

Valve 12 comprises a body 20 and a valve element shown at 21 which, as is shown, is normally in wide open position. Extending upwardly from the valve element 21 is a valve stem 22 connected with an armature 23 which is in turn surrounded by a solenoid 24. Energization of solenoid 24 causes armature 23 and valve element 21 to move upwardly into a position in which the flow of fuel to the furnace 10 is cut off entirely. Valve 15 comprises a valve body 26 and a valve element 27 which is normally in closed position. Extending upwardly from the valve element 27 is a valve stem 28 to which is connected an armature 29 surrounded by a solenoid 30, energization of which causes armature 29 and valve element 26 to move into open position. With both valves 15 and 20 in open position, valve 13 exercises no control over the supply of fuel to the furnace 10 and the supply of fuel is at a maximum.

Valve 13 is provided to regulate the amount of fuel which may pass to the furnace 10 when valves 12 and 15 are in their normal positions as illustrated. To valve 13 is connected a stem 32, which stem is connected by means of a link 33 to a crank member 34. With the crank in the position illustrated, valve 13 is in mid position permitting the fuel to be supplied to the furnace 10 at approximately 50% of the maximum capacity of the furnace.

A section of an outside wall of the space being heated is represented by the reference character 40 and positioned in said space is a tube 41 which communicates with an expansible bellows 42. Tube 41 is filled with an expansible fluid which expands or contracts in response to temperature changes so that a change in temperature at the point where the tube 41 is located will cause a change in pressure in bellows 42 causing said bellows to expand or contract according to whether the temperature surrounding the tube 41 has increased or decreased.

A motor generally indicated by the reference character 50 is provided for causing operation of crank member 34 and the adjustment of valve 13. This motor is of the condenser induction type and comprises an armature 51, field coils 52 and 53, and a condenser 54. Field windings 52 and 53 are connected together at one end thereof and between the opposite ends of said windings is connected the condenser 54. The junction of windings 52 and 53 is permanently connected to the low tension secondary 55 of a step-down transformer 56, the high tension primary 57 of said transformer being connected by means of conductors 58 and 59 to lines 100 and 101 which are in turn connected to a suitable source of power (not shown).

Condenser 54 may be selectively connected between either winding 52 or 53 to the other side of the transformer secondary 55, and the other winding is directly connected to said other side of the transformer secondary 55. The current through the winding which is in series with condenser 54 leads the current through the other winding in phase and thus the direction of rotation of armature 51 may be controlled by changing the winding in series with said condenser.

A relay generally indicated by the reference character 60 is provided for changing the phase relationship of windings 52 and 53. This relay is of the balanced type and comprises opposed windings 61 and 62, an armature 63 connected to a switch arm 64, said arm cooperating with fixed contacts 65 and 66. Windings 61 and 62 are connected together at one end, the opposite end of winding 61 being connected to the transformer secondary 55 by means of conductors 70 and 71 and the other end of coil 62 being connected to the opposite side of the transformer secondary 55 by means of conductors 72 and 73. Connected in parallel with the coils 61 and 62 is a potentiometer resistance 75 of a potentiometer 74, said resistance being connected to the coils by means of protective resistances 76 and 77. A potentiometer arm 78 is arranged to sweep across the resistance 75, this arm being connected by means of a link 79 to the bellows 42 to be actuated thereby.

A second potentiometer resistance 80 of a potentiometer 86 is connected by means of conductors 81 and 82 in parallel with the potentiometer resistance 75 and therefore to the relay coils 61 and 62. An arm 93 is arranged to sweep across resistance 80, this arm being mounted on a shaft 84 which is connected by means of a reduction gearing 85 to the armature 51 of motor 50 for rotation thereby. Shaft 84 also carries the crank 34 for rotation therewith and also carries an insulated arm 90 which cooperates with switches 91 and 92, switch 91 including contact elements 93 and 94 and switch 92 including contact elements 95 and 96.

Arms 78 and 83 of potentiometers 74 and 86, respectively, are connected together by means of conductors 102 and 103 and these arms are also connected to the junction of coils 61 and 62 of relay 60 by means of conductors 102, 103, and 104, as illustrated. Potentiometer 74 is a controlling potentiometer and acts as a voltage divider for coils 61 and 62. With arm 78 in the mid position, as shown, disregarding for the moment potentiometer 86, it will be apparent that the current through coils 61 and 62 is equal so that these coils have no effect on armature 63 and it remains in the mid position as illustrated. Movement of arm 78 to the right will cause the current through coil 61 to become greater than that through coil 62, thus causing armature 63 to move to the left, and conversely, movement of the arm 78 to the left causes relay coil 62 to become more highly energized than coil 61 whereupon the armature 63 moves to the right, switch arm 64 being moved by armature 63 into engagement with either contacts 65 or 66, depending upon which relay coil is the more highly energized. Potentiometer 86 is a balancing potentiometer and is designed to balance the effect of potentiometer 74. Thus as arm 78 of potentiometer 74 is moved to the right, movement of arm 83 of potentiometer 86 to the left a corresponding amount will neutralize the effect of potentiometer 74 on relay 60.

Resistances 76 and 77 are for the purpose of preventing a short circuit across the transformer secondary should the arms 78 and 83 reach their extreme positions so that current does not have to flow through the potentiometer resistances 75 and 80. Switches 91 and 92 are provided between the field windings 53 and 52, respectively, and the source of power, and are opened upon sufficient movement of the arm 90 in either direction so as to prevent rotation of crank member 34 beyond a predetermined point by the motor 50.

Mounted in the space being heated is a thermostat 110, said thermostat comprising a bi-metallic element 111, a blade 112 connected thereto for movement thereby in response to temperature changes in the space 110 and fixed contacts 113 and 114 for cooperation with blade 112.

For controlling the current through solenoid 24 is a relay indicated generally by the reference character 116, this relay comprising a coil 117, an armature 118, switch blade 119, and a fixed contact 120. Energization of solenoid 30 is controlled by a relay 122 which relay comprises a relay coil 123, an armature 124, a switch blade 125 and a fixed contact 126 cooperating therewith. These relays are controlled by thermostat 110 as will be hereinafter pointed out. For energizing said relays a transformer 130 is provided, said transformer including a low tension secondary 131 and a high tension primary 132, said primary being connected across the lines 100 and 101 by means of conductors 133 and 134.

With the parts in the position illustrated, valve 13 is in mid position in which it is supplying about 50% of the maximum capacity of the burner 10. Valve 12 is in its normal open position and valve 15 is in its normal closed position. Thermostat 110 is in mid position in which position it is neither calling for more nor less heat.

The tube 41 is located a sufficient distance from the inside wall surface of the space being heated so that a change in temperature at this point will take the same length of time to effect the temperature of the space as will a change in the flow of gas to furnace 10 take to affect the temperature of the space.

*Operation*

Assume that the outside temperature begins to fall. This will not have any effect on the temperature of the space until a considerable time elapses. After a certain length of time, the temperature of the wall at the point at which tube 41 is located will decrease causing a contraction of bellows 42 whereupon the arm 78 of potentiometer 75 will move to the left an amount which is in proportion to the amount of fall in temperature at the aforementioned point in said wall. Movement of arm 78 to the left will cause relay coil 62 to become more highly energized than coil 61 whereupon the armature 63 will move to the right causing switch arm 64 to move into engagement with contact 66. Motor 50 will now be energized through the following circuits: from the secondary 55 of transformer 56, through conductors 73, 140, switch blade 64, contact 66, conductor 141, switch elements 95 and 96, conductor 142 through field winding 52 and through conductors 143 and 71 to the other side of the transformer secondary 55. Current also flows through the field winding 53 as follows: from the secondary 55 through conductors 73, 140, switch blade 64, contact 66, conductor 141, switch elements 95, 96, conductors 142, 144, through the condenser 54, conductor 145 through field winding 53 and conductors 143 and 71 to the other side of secondary 55. Current through winding 53 leads that through winding 52 in phase and the armature rotates in a clockwise direction causing crank 34 to move in the same direction. Potentiometer arm 83 is moved to the right, and the motor armature 51 continues to rotate until arm 83 has moved a distance which is sufficient to balance the effect of potentiometer 75 on coils 61 and 62 of relay 60. When this happens, coils 61 and 62 again become equally energized, whereupon armature 63 moves back to mid position causing switch blade 64 to also move to mid position. Crank 34 has now caused valve 13 to open an amount which is in proportion to the fall in temperature at the point in wall 40 where tube 41 is located. The amount of fuel supplied to furnace 10 is accordingly increased. After a sufficient time elapses the effect of this increase in fuel delivery will be apparent in the space being heated. At the time that the effect of the increased fuel supply is felt in the space being heated, the effect of the lowered temperature on the outside of wall 40 will also be felt in the room so that the increase in fuel delivery will just compensate for the lowered outside temperature and will become effective at the time that additional heat will be required in the space. It will, therefore, be seen that a fall in temperature in the room occasioned by a decrease in outdoor temperature is anticipated by the heater before the lowered outdoor temperature actually affects the temperature of the room.

Should an abnormal condition cause a rapid lowering of the temperature in the space, such as the opening of a window or a door, the temperature responsive member 41 will be ineffective to cause an immediate increase in the flow of fuel to the burner. The bimetallic element 111 of room thermostat 110 will cause arm 112 carried thereby to be moved to the left in response to this decrease in temperature, into engagement with contact 113. Relay coil 122 will now be energized through the following circuit: from transformer secondary 131, through conductor 150, the bimetallic element 111, arm 112, contact 113, conductor 151, relay coil 123, and conductor 152 to the other side of secondary 131. Energization of coil 123 causes switch blade 125 to move into engagement with contact 126 whereupon solenoid 30 is energized through the following circuit: from line 100 through conductors 155, 156, switch blade 125, contact 126, conductor 157 through the solenoid 30 and conductors 158 and 159 to the line 101. Energization of solenoid 30 causes armature 29 and valve element 27 to be moved upwardly, whereupon fuel may flow through the valve 15 and pipe line 14 to the burner 10. Thus the fuel is allowed to by-pass the valve 13 and the amount of fuel being delivered to the furnace 10 is at a maximum. The temperature in the space will accordingly begin to rise after a certain time, and after a certain length of time thermostat 110 will become satisfied and blade 112 will be moved to mid position by the bimetallic element 111, whereupon relay 122 will be deenergized, in turn causing solenoid 30 to become deenergized whereupon the valve 27 moves back to closed position and the furnace 10 is again under the control of valve 13.

Should the temperature in the space for some reason rise to a certain high value, it will be desirable to stop the supply of fuel to the furnace 10. The attainment of this high temperature will result in bimetallic element 111 moving the thermostat blade 112 into engagement with contact 114 and energizing relay coil 117 through the following circuit: from the low tension secondary 131 of transformer 130, through conductor 150, bimetallic element 111, arm 112, contact 114, conductor 160, through coil 117 and conductors 161 and 152 to the other side of secondary 131. Switch blade 119 is now caused to move into engagement with contact 120 whereupon solenoid 24 is energized through the following circuit: from line 100, through conductors 155, 162, switch blade 119, contact 120, conductor 163, through solenoid 24 and conductors 164 and 159 to the line 101. Energization of solenoid 24 causes valve element 21 to move upwardly into a position in which the supply of fuel to furnace 10 is cut off entirely. This situation will exist until the temperature of the space being heated falls to a desired value whereupon the arm 112 moves out of engagement with contact 114 thus causing relay coil 117 to become deenergized which results in the deenergization of solenoid 24. Valve 21 now moves back to its normally open position whereupon furnace 10 is placed under control of valve 13.

Should the outside temperature continue to drop, it will be apparent that after a certain time elapses bellows 42 will be further contracted moving arm 78 further to the left causing a corresponding rotation of motor armature 51 and crank member 34 until the effect of potentiometer 74 is again neutralized by the movement of arm 83 further to the right over potentiometer 86.

Assume now that the outdoor temperature begins to rise after a certain period of time. This increase in outdoor temperature will be felt by the tube 41 whereupon the fluid therein expands causing expansion of bellows 42 which will cause arm 78 to move towards the right, whereupon the relay coil 61 will become more highly energized than coil 62 and armature 63 will move toward the left moving with it switch arm 64 into engagement with contact 65. Motor 50 will now be energized through the following circuit: from transformer secondary 55, through conductors 73, 140, switch blade 64, contact 65, conductor 170, switch elements 94 and 93, conductor 171 through winding 53 and conductors 143 and 71 to the other side of secondary 55. Current also flows through field winding 52 as follows: from the secondary 55 through conductors 73, 140, switch blade 64, contact 65, conductor 170, switch elements 94 and 93, conductors 171 and 145, condenser 54, conductor 144, field winding 52 and conductors 143 and 71 to the other side of secondary 55. The current through winding 52 now leads the current through winding 53 in phase and causes armature 51 to move in a counter-clockwise direction, which in turn causes crank element 54 to move in a clockwise direction, thus moving valve 13 towards closed position. This movement will continue until arm 83 which is being moved to the left over resistance 80 has moved far enough to counteract the effect of potentiometer 75 on the relay coils 61 and 62, whereupon armature 63 and switch blade 64 will move back to their mid positions causing deenergization of motor 50.

The amount of fuel now passing through valve 13 has been reduced just enough to compensate for the increase in the outdoor temperature so that when the increase is felt in the space being heated, the decrease in heat delivery to said space will also be decreased to just compensate for the increase in the outdoor temperature.

It will thus be seen that when no abnormal conditions affect the temperature of the space being heated, that the fuel delivery to the heater will automatically be adjusted in accordance with changes in the outdoor temperature at the proper time so that when the effect of the outdoor temperature change would be felt in the space being heated the corresponding change in the fuel supply to the furnace will be effective at the same time. Therefore, under normal conditions in which changing outdoor temperatures are the only elements affecting the temperature of the space, a substantially constant temperature will at all times be maintained in the space. However, should abnormal conditions arise causing a raising or lowering of the space temperature above or below the desired values, the supply of fuel to the burner will immediately be reduced or increased according to whether the temperatures are too high or too low.

This system, of course, would be just as applicable to a cooling system in which a cooling medium was being supplied to a device for the purpose of maintaining a predetermined low temperature during the summertime as it is to a heating system. It will also be obvious that the system is equally applicable to one using other types of fuel than gas for the heating medium. It would also be useful in other types of heating systems, such as a hot air heating system, having a shorter time lag than a hot water system. In such a system, tube 41 would, of course, be placed nearer the inside of wall 40 since it has to compensate for a shorter time lag.

While I have illustrated a preferred form of my invention, I wish it to be distinctly understood that my invention is capable of many modifications which will become apparent to those skilled in the art and that it is to be limited only by the scope of the appended claims.

I claim as my invention:

1. In a temperature control system, a temperature changing device, means for conducting a temperature changing medium to said device, a first valve means for regulating the flow of said medium through said conducting means, a second valve means controlling the flow of said medium to said device, temperature responsive means responsive to the temperature at a point in a wall of a space whose temperature is being controlled, in control of said first valve means, said point being so located that the time required for a change in temperature at said point to affect the temperature of said space is approximately equal to the time required for operation of said first valve means to affect the temperature of said space, space temperature responsive means in control of said second valve means whereby the second valve means cuts off the supply of the temperature changing medium in response to the attainment of one predetermined temperature and causes maximum flow of said medium in response to the attainment of a second predetermined temperature in said space.

2. In a temperature control system, a temperature changing device for controlling the temperature of a space, means for conducting a temperature changing medium to said device, said means comprising a pipe including a main line and a pair of branch lines, a normally open valve in said main line, a normally closed valve in one of said branch lines, an adjustable valve in said other branch line, temperature responsive means located within the outside wall of the building for controlling the position of said adjustable valve in accordance with the temperature within said outside wall, means responsive to the attainment of one undesirable temperature in said space for opening said normally closed valve, and means responsive to the attainment of another undesirable temperature in said space for closing said normally open valve.

3. In a temperature control system, a temperature changing device for controlling the temperature of a space, means for conducting a temperature changing medium to said device, said means comprising a pipe including a main line and a pair of branch lines, a normally open valve in said main line, a normally closed valve in one of said branch lines, an adjustable valve in said other branch line, temperature responsive means located within the outside wall of the building for controlling the position of said adjustable valve in accordance with the temperature within said outside wall, said temperature responsive means being so located within said wall that the time required for a change in temperature at said point to affect the temperature of said space is substantially equal to the time required for a change in the position of said adjustable valve to affect the temperature of said space, means responsive to the attainment of one undesirable temperature in said space for opening said normally closed valve, and means responsive to the attainment of another undesirable temperature in said space for closing said normally open valve.

HENRY E. HARTIG.